Dec. 20, 1938.  F. R. HECK  2,141,136
DOUBLE ROW ROLLER BEARING
Filed March 11, 1938
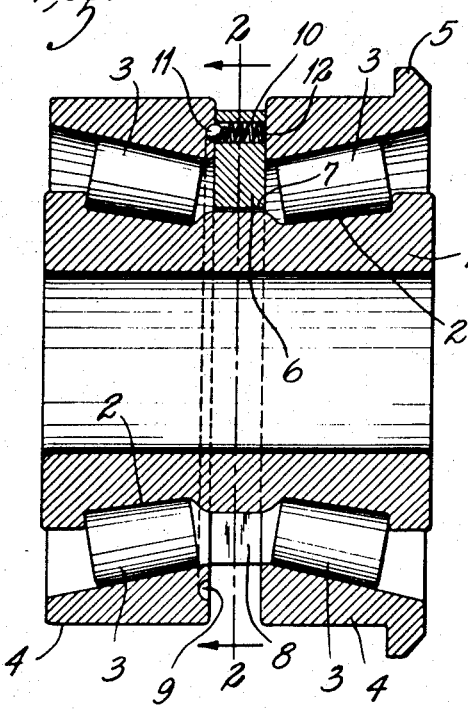
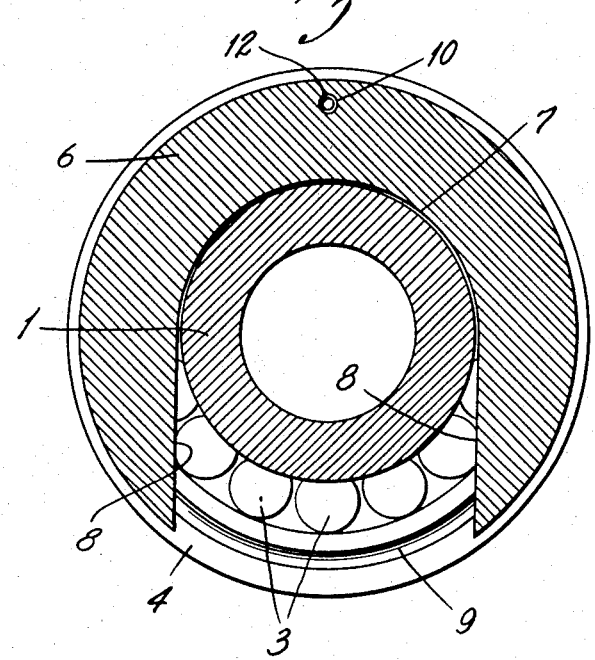
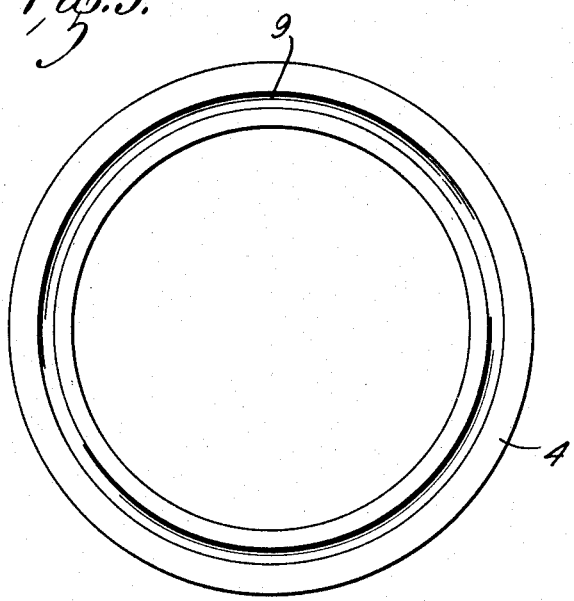
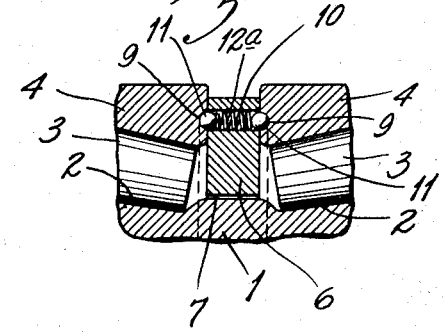
INVENTOR:
Fred R. Heck,
by Cann Karn & Gravely,
HIS ATTORNEYS.

Patented Dec. 20, 1938

2,141,136

UNITED STATES PATENT OFFICE 2,141,136

DOUBLE ROW ROLLER BEARING

Fred R. Heck, Canton, Ohio, assignor to The Timken Roller Bearing Company, Canton, Ohio, a corporation of Ohio Application March 11, 1938, Serial No. 195,222

6 Claims. (Cl. 308—214)

My invention relates to roller bearings of the type having two series of rollers and separate outer bearing members therefor, means being provided between said outer bearing members for holding them in proper spaced running position.

The invention has for its principal object a bearing of this type which is easy to assemble and disassemble, in which the outer bearing members are accurately positioned and in which accidental displacement of the positioning device is prevented.

The invention consists in the double row roller bearing and in the parts and combinations and arrangements of parts hereinafter described and claimed.

In the accompanying drawing,

Fig. 1 is a longitudinal sectional view of a bearing of the type commonly used in rocker arms, embodying my invention;

Fig. 2 is a cross-sectional view on the line 2—2 in Fig. 1;

Fig. 3 is an elevation of one of the outer bearing members; and

Fig. 4 is a fragmentary longitudinal sectional view through the bearing cups, showing a modification.

The drawing illustrates a bearing comprising a double inner bearing member or cone 1 having conical raceways 2 thereon that taper toward the middle of the bearing, two series of taper bearing rollers 3 and a separate outer bearing member or cup 4 for each series of rollers, one of said cups being shown as provided with a peripheral flange 5 for abutment against the face or shoulder of a suitable mounting member, as a rocker arm. The present invention is concerned with the means for holding the bearing cups in proper spaced running position.

Interposed between the opposed inner end faces of the cups is a substantially C-shaped washer 6 having an arcuate outer surface, a semi-circular opening 7 and inner jaw margins 8 extending tangentially from the ends of said semi-circular opening. The opening in said C-shaped washer is of a size to fit loosely over the middle portion of the cone.

As shown in Figs. 1 and 2, the end face of one of said cups is provided with an annular groove 9. The washer is provided with a bore 10 therethrough parallel to the bearing axis, in which are mounted a ball 11 and a spring 12, the spring reacting against the end face of the ungrooved cup to force the ball against the end face of the other cup, the ball seating in said groove 9 when the washer is placed in proper position, thereby holding the parts of the bearing together.

In the modification shown in Fig. 4, both cups have annular grooves 9 in their end faces, the spacing washer having a ball 11 in each end of its bore, with a spring 12a interposed between said balls to force them apart.

A spacing washer is selected of the proper size required to give the desired running clearance in the bearing and said washer is slipped over the cone between the two cups. The ball (or balls) locks the parts together by seating in the groove (or grooves). By applying sufficient force to the washer, the ball (or balls) may be forced into the bore of the washer and the washer withdrawn.

What I claim is:

1. A double row roller bearing comprising two annular series of rollers, a separate bearing cup for each series of rollers, said cups being disposed with their opposed ends spaced apart, one of said opposed cup faces having an annular groove therein, an open ended washer interposed between said cup faces and a spring pressed ball in said washer for locking engagement with said groove.

2. A double row roller bearing comprising two annular series of rollers, a separate bearing cup for each series of rollers, said cups being disposed with their opposed ends spaced apart, one of said opposed cup faces having an annular groove therein, an open ended washer interposed between said cup faces, said washer having a bore in its closed end extending parallel to the bearing axis, a ball in said bore and a spring in said bore pressing said ball into locking engagement with said groove.

3. A double row roller bearing comprising two annular series of rollers, a separate bearing cup for each series of rollers, said cups being disposed with their opposed ends spaced apart, each of said opposed cup faces having an annular groove therein, an open ended washer interposed between said cup faces and spring pressed balls in said washer for locking engagement with said grooves, respectively.

4. A double row roller bearing comprising two annular series of rollers, a separate bearing cup for each series of rollers, said cups being disposed with their opposed ends spaced apart, each of said opposed cup faces having an annular groove therein, an open ended washer interposed between said cup faces, said washer having a bore in its closed end extending parallel to the bearing axis, a ball in each end of said bore and a spring in said bore between said balls for pressing them into locking engagement with said grooves respectively.

5. A double row roller bearing comprising two annular series of rollers, a bearing cone having raceways for said rollers and a cylindrical portion between said raceways, a separate bearing cup for each series of rollers, said cups being disposed with their opposed ends spaced apart, one of said opposed cup faces having an annular groove therein, a substantially C-shaped washer interposed between said cup faces, said washer having a semi-circular opening therein large enough in diameter to fit loosely over said cylindrical portion of said cone and jaws whose inner margins extend tangentially from the ends of said opening, and a spring pressed ball in said washer for locking engagement with said groove.

6. A double row roller bearing comprising two annular series of rollers, a bearing cone having raceways for said rollers and a cylindrical portion between said raceways, a separate bearing cup for each series of rollers, said cups being disposed with their opposed ends spaced apart, each of said opposed cup faces having an annular groove therein, a substantially C-shaped washer interposed between said cup faces, said washer having a semi-circular opening therein large enough in diameter to fit loosely over said cylindrical portion of said cone and jaws whose inner margins extend tangentially from the ends of said opening, and spring pressed balls in said washer for locking engagement with said grooves.

FRED R. HECK.